(12) United States Patent
Bahrenburg et al.

(10) Patent No.: US 6,721,294 B1
(45) Date of Patent: Apr. 13, 2004

(54) METHOD AND DEVICE FOR ALLOCATING CHANNELS IN A CDMA RADIOCOMMUNICATIONS SYSTEM

(75) Inventors: Stefan Bahrenburg, München (DE); Paul Walter Baier, Kaiserslautern (DE); Dieter Emmer, Starnberg (DE); Jürgen Mayer, Schifferstadt (DE); Johannes Schlee, Blaustein (DE); Thomas Weber, Otterbach (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/646,853

(22) PCT Filed: Mar. 25, 1999

(86) PCT No.: PCT/DE99/00917

§ 371 (c)(1),
(2), (4) Date: Sep. 22, 2000

(87) PCT Pub. No.: WO99/49684

PCT Pub. Date: Sep. 30, 1999

(30) Foreign Application Priority Data

Mar. 25, 1998 (DE) ......................... 198 13 183

(51) Int. Cl.[7] ............................................. H04B 07/216
(52) U.S. Cl. ...................... 370/335; 370/342; 370/348; 370/437; 370/442; 455/509; 455/515
(58) Field of Search ................................. 370/280, 281, 370/314, 320, 321, 322, 328, 329, 330, 331, 335, 337, 342, 345, 347, 348, 432, 437, 442, 477, 478, 436, 441, 479; 455/422, 436, 442, 464, 507, 509, 515, 517, 524, 525

(56) References Cited

U.S. PATENT DOCUMENTS

| | | | |
|---|---|---|---|
| 4,763,322 A | | 8/1988 | Eizenhöfer |
| 5,742,593 A | | 4/1998 | Sharony et al. |
| 5,815,497 A | | 9/1998 | Ramel |
| 6,275,506 B1 | * | 8/2001 | Fazel et al. .................. 370/478 |
| 6,434,128 B1 | * | 8/2002 | Benz et al. .................. 370/329 |

FOREIGN PATENT DOCUMENTS

| | | |
|---|---|---|
| DE | 195 49 148 | 3/1997 |
| EP | 0 655 845 | 5/1995 |

OTHER PUBLICATIONS

Jacek Biala—Mobilfunk und Intelligente Netze—pp. 173–185.
Protocol and Signalling Aspects of Joint Detection CDMA—Mayer et al—Mar. 9, 1998.

* cited by examiner

*Primary Examiner*—Wellington Chin
*Assistant Examiner*—Mark A Mais
(74) *Attorney, Agent, or Firm*—Staas & Halsey LLP

(57) ABSTRACT

In a method and arrangement for channel allocation in a radio communication system that uses a TD/CDMA subscriber separation method, an allocation of at least one channel is signalled to a radio station by an information element in a signalling message. At least one time slot is thereby selected by a time slot selection sub-information element. Subsequently, at least one CDMA code is selected for each selected time slot with a code selection sub-information element, whereby a number of code selection sub-information elements corresponds to a number of selected time slots.

21 Claims, 7 Drawing Sheets

Channel allocation by UCD or DCD

| Sub-Information element | Length (bit) | bits | | | | | | | | Commentary |
|---|---|---|---|---|---|---|---|---|---|---|
| Nr_ts | 5 | 0 | 1 | 0 | 0 | 0 | | | | 8 ts per fk defined. |
| ts-flags | 8 (Nr_ts) | 0 ts7 | 0 ts6 | 0 ts5 | 0 ts4 | 1 ts3 | 0 ts2 | 0 ts1 | 1 ts0 | ts0 and ts3 marked. |
| Nr_c | 5 | 0 | 1 | 0 | 0 | 0 | | | | 8 c per ts defined |
| c-flags (for ts0) | 8 (Nr_c) | 0 c7 | 0 c6 | 0 c5 | 0 c4 | 0 c3 | 0 c2 | 1 c1 | 1 c0 | c0 and c1 marked. |
| c-flags (for ts3) | 8 (Nr_c) | 0 | 0 | 1 | 1 | 0 | 0 | 0 | 0 | c4 and c5 marked. |

Prior Art

FIG 4  Signalling Message AC

| : | : |
|---|---|
| UCD | m |
| DCD | m |
| Additional UCD | o* |
| Additional DCD | o* |
| Channel Mode | o* |

FIG 5  Information element DCD/Additional DCD

| | |
|---|---|
| T (IEI) | 8 bit |
| L (l) | 8 bit |
| W (Nr_fk) | 7 bit |
| W (Nr_ts) | 5 bit |
| W (ts-flags) | Nr_ts |
| W (Nr_c) | 5 bit |
| W* (c-flags) | Nr_tsges*Nr_c |

FIG 6  Information element UCD/Additional UCD

| | |
|---|---|
| T (IEI) | 8 bit |
| L (l) | 8 bit |
| W (Nr_fk) | 7 bit |
| W (Nr_ts) | 5 bit |
| W (ts-flags) | Nr_ts |
| W (Nr_c) | 5 bit |
| W* (c-flags) | Nr_tsges*Nr_c |
| W (Nr_m) | 5 bit |
| W* (m-flags) | Nr_tsges*Nr_m |

FIG 7    Channel allocation by UCD or DCD

| Sub-Information element | Length (bit) | bits | | | | | | | | Commentary |
|---|---|---|---|---|---|---|---|---|---|---|
| Nr_ts | 5 | 0 | 1 | 0 | 0 | 0 | | | | 8 ts per fk defined. |
| ts-flags | 8 (Nr_ts) | 0 ts7 | 0 ts6 | 0 ts5 | 0 ts4 | 1 ts3 | 0 ts2 | 0 ts1 | 1 ts0 | ts0 and ts3 marked. |
| Nr_c | 5 | 0 | 1 | 0 | 0 | 0 | | | | 8 c per ts defined |
| c-flags (for ts0) | 8 (Nr_c) | 0 c7 | 0 c6 | 0 c5 | 0 c4 | 0 c3 | 0 c2 | 1 c1 | 1 c0 | c0 and c1 marked. |
| c-flags (for ts3) | 8 (Nr_c) | 0 | 0 | 1 | 1 | 0 | 0 | 0 | 0 | c4 and c5 marked. |

FIG 8 — Information element DCD/Additional DCD

| | |
|---|---|
| T (IEI) | 8 bit |
| L (l) | 8 bit |
| W (Nr_fk) | 7 bit |
| W (Nr_c) | 5 bit |
| W (c-flags) | Nr_c |
| W (Nr_ts) | 5 bit |
| W (ts-flags) | Nr_ts |

FIG 9 — Information element UCD/Additional UCD

| | |
|---|---|
| T (IEI) | 8 bit |
| L (l) | 8 bit |
| W (Nr_fk) | 7 bit |
| W (Nr_c) | 5 bit |
| W (c-flags) | Nr_c |
| W (Nr_c) | 5 bit |
| W (ts-flags) | Nr_ts |
| W (Nr_m) | 5 bit |
| W* (m-flags) | Nr_tsges*Nr_m |

FIG 10  Channel allocation by UCD or DCD

| Sub-Information element | Length (bit) | bits | | | | | | | | Commentary |
|---|---|---|---|---|---|---|---|---|---|---|
| Nr_c | 5 | 0 | 1 | 0 | 0 | 0 | | | | 8 c per ts defined |
| c-flags | 8 (Nr_c) | 0 c7 | 0 c6 | 0 c5 | 0 c4 | 0 c3 | 0 c2 | 1 c1 | 1 c0 | c0 and c1 marked. |
| Nr_ts | 5 | 0 | 1 | 0 | 0 | 0 | | | | 8 ts per fk defined. |
| ts-flags | 8 (Nr_ts) | 0 ts7 | 0 ts6 | 0 ts5 | 0 ts4 | 1 ts3 | 0 ts2 | 0 ts1 | 1 ts0 | ts0 and ts3 marked. |

METHOD AND DEVICE FOR ALLOCATING CHANNELS IN A CDMA RADIOCOMMUNICATIONS SYSTEM

BACKGROUND OF THE INVENTION

The invention is directed to a method and to an arrangement for channel allocation in a radio communication system, particularly in a radiotelephone system.

In radio communication systems, information such as, for example, voice, image information or other data are transmitted between a sending and a receiving radio station such as, for example, a base station or radio station with the assistance of electromagnetic waves via a radio interface. The emission of the electromagnetic waves thereby occurs with carrier frequencies that lie in the frequency band provided for the respective system. The carrier frequencies lie in the region of 900 MHz, 1800 MHz and 1900 MHz in GSM (Global System for Mobile communication) that is known from, among others, J. Biala, "Mobilfunk und Intelligente Netze", Vieweg Verlag, 1995. Frequencies in the frequency band of approximately 2000 MHz are provided for future mobile radiotelephone systems with CDMA or TD/CDMA transmission methods via the radio interface such as, for example, the UMTS (Universal Mobile Telecommunication System) or other systems of the $3^{rd}$ generation.

The article by J. Mayer, J. Schlee, T. Weber, "Protocol and Signalling Aspects of Joint Detection CDMA", PIMRC'97, Helsinki, 1997, pp. 867–871, discloses that respectively one or more traffic channels can be allocated to a communication connection on the basis of a channel pooling, whereby each traffic channel according to a CDMA transmission method can be distinguished by an individual CDMA code. The method of channel pooling is advantageously utilized in order to realize a communication connection to or from radio stations with different data rates or to be able to operate a plurality of services in parallel on one communication connection. A traffic channel, which is referred to simply as a channel in the rest of the specification, is thereby defined as a combination of a frequency channel, a time slot and a CDMA code. Instead of a permanently allocated frequency channel, time slot and CDMA code, a respective frequency skip sequence, time slot skip sequence or CDMA code skip sequence can also be employed as an alternative.

In the known mobile radiotelephone systems such as, for example, the GSM, signalling messages that are employed in a connection setup or in a handover contain information elements that specify the channel to be respectively allocated for the transmission of payload data. The connection setup and handover procedures are disclosed on pages 173–185 of the Prior Art of J. Biala. A separate information element for each channel to be designated is provided according to this system. Given a utilization of channel pooling in a TD/CDMA mobile radiotelephone system, a plurality of channels can be allocated to a radio station, whereby a midamble code must also be respectively additionally communicated in the upstream direction from the radio station to the base station. The use of the method of channel allocation known from the GSM mobile radiotelephone system with an information element for each channel to be allocated in a TD/CDMA mobile radiotelephone system would result in the occurrence of a very high signalling expense that disadvantageously limits the transmission capacity and the flexibility of the mobile radiotelephone system.

SUMMARY OF THE INVENTION

It is an object of the invention to specify a method that enables an allocation of a plurality of channels while avoiding a high signalling expense.

According to the method and system of the invention, for channel allocation in a radio communication system that uses a TD/CDMA subscriber separation method, an allocation of at least one channel from a sum of available channels is signaled to a radio station by an information element in a signaling message. At least one time slot from a fixed sum of time slots is selected by a time slot selection sub-information element in the information element. At least one CDMA code from a fixed sum of CDMA codes is subsequently selected for each selected time slot by a code selection sub-information element in the information element, whereby a number of code selection sub-information elements for the selection of the CDMA codes corresponds to the number of selected time slots.

In the method of the invention for channel allocation in the radio communication system that uses a TD/CDMA subscriber separation method, the allocation of at least one channel from a sum of available channels is signaled to a radio station by an information element in a signaling message. At least one time slot from a defined sum of time slots is selected in the information element with a time slot selection sub-information element. Subsequently, at least one CDMA code from a fixed sum of CDMA codes is selected by a code selection sub-information element for each selected time slot in the information element, whereby the plurality of code selection sub-information elements for the selection of the CDMA codes corresponds to the plurality of selected time slots.

Compared to the prior art, this method has the advantage that the radio station can have one or more channels in one or more time slots allocated to it with a single information element in a signaling message. The plurality of sub-information elements in the information element required for the selection of the time slots and of the CDMA codes is advantageously reduced in that the allocation of the channels occurs in down hierachic fashion in such a way that at least one time slot is selected first and at least one CDMA code is subsequently selected for each time slot. Due to the dependency on the respective time slot in the selection of the CDMA codes, the selected time slots need be defined in only one sub-information element. A great flexibility in the selection of the CDMA codes in the time slots is also advantageously assured, so that, for example, the plurality of selected CDMA codes in the respective time slots can vary.

In the method according to the invention for channel allocation in a radio communication system that uses a TD/CDMA subscriber separation method, the allocation of at least one channel from a sum of available channels is signaled to a radio station by an information element in a signaling message. At least one CDMA code from a fixed sum of CDMA codes is selected in the information element with a code selection sub-information element. Subsequently, at least one time slot from a fixed sum of time slots is selected in the information element with a time slot selection sub-information element, whereby the selected CDMA codes are employed in each selected time slot.

This method according to the invention has the advantage that, as a result of the hierarchic structure wherein one or more CDMA codes and, subsequently, one or more time slots are selected, the plurality of sub-information elements is minimized. By using the same CDMA code in a plurality of time slots, only respective a single code selection and time slot selection sub-information element is needed for a channel allocation.

According to a first development of the invention, a frequency channel for the upstream or downstream direction is additionally selected in the information element from a sum of frequency channels, being selected with a frequency channel selection sub-information element, whereby the number of time slots is referred to the selected frequency channel.

With reference to the first development of the invention and according to a second development, the allocation of additional channels in at least one further frequency channel to the radio station in the signaling message is signaled with an additional information element for each additional frequency channel, whereby the structure of the additional information element corresponds to that of the information element.

This feature makes it advantageously possible that a radio station that, as a result of its technical configuration, is in the position to send or to receive on a plurality of frequency channels can have channels in a plurality of frequency channels allocated to it in one signaling message. The allocation thereby in turn occurs in such a way that an information element or additional information element is provided for each frequency channel.

In accordance with a further development, the sum of the time slots is indicated in the information element with a sum time slot sub-information element and/or a sum of the CDMA codes for a time slot is indicated by a sum code sub-information element. Due to this embodiment, the plurality of time slots and/or the plurality of CDMA codes per time slot can be very flexibly adapted to the demands, for example with reference to the transmission capacity of a channel.

According to a further development of the invention, the sum of the midambles for the upstream direction is indicated in the information element by a sum midamble sub-information element, and one midamble is subsequently selected from the sub of midambles by a respective selection midamble sub-information element for each selected time slot. In this development, advantageously, only the common midamble is employed for all channels following a general definition of the plurality of midambles employed, for example, per frequency channel in each time slot in which CDMA codes were selected for the radio station. As a result thereof, the signaling expense in the allocation of the midambles is advantageously reduced, and the signal processing both in the radio station as well as in the base station is facilitated.

According to a further development of the invention, the plurality of channels to be allocated is determined by the radio station from a length of the information element. The radio station is thereby in the position to determine the plurality of channels to be allocated to it from the length of the sub-information elements.

With reference to the above development, the radio station in a further development is informed of the length of the information element by a length field, as a result whereof the radio station is already aware of the entire length of the information element before the beginning of the channel allocation. This advantageously serves for faster processing of the information contained in the information element by the radio station.

According to a further development of the invention, the channels for the upstream direction and for the downstream direction are allocated to the radio station independently of one another in the signaling message. As a result of this embodiment, asymmetrical data rates for the upstream and downstream direction can be advantageously achieved by the allocation of a respectively different plurality of channels.

An exemplary embodiment of the invention is shown in the following drawings.

BRIEF DESCRIPTION OF THE INVENTION

FIG. 4 shows the structure of a signaling message AC with information elements;

FIG. 5 shows the structure of an information element DCD/additional DCD;

FIG. 6 shows the structure of an information element UCD/additional UCD;

FIG. 7 shows the allocation of channels with sub-information elements;

FIG. 8 illustrates the structure of an information element DCD/additional DCD;

FIG. 9 the structure of an information element UCD/additional UCD; and

FIG. 10 shows the allocation of channels by sub-information elements.

DESCRIPTION OF THE PREFERRED EMBODIMENTS

Figure 1:
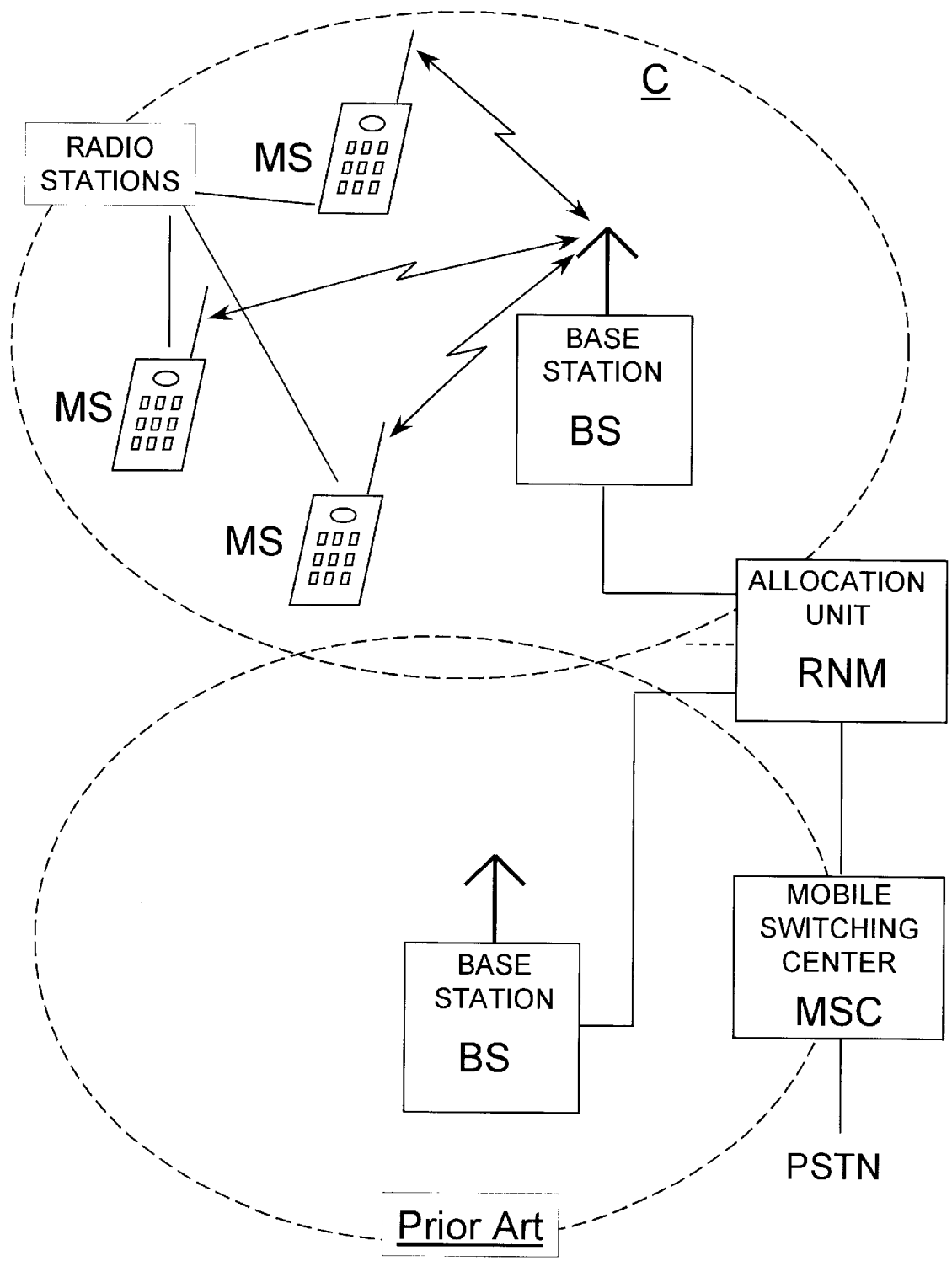
FIG. 1 is a block circuit diagram of a radio communication system, particularly of a mobile radio telephone system.

The radio communication system shown in FIG. 1 and implemented as a mobile radio telephone system is composed of a plurality of mobile switching centers MSC that are networked with one another or produce access to a fixed network PSTN. Further, these mobile switching centers MSC are respectively connected to at least one allocation unit RNM for the allocation of radio-oriented resources. Each of these allocation units RNM in turn enables a connection to at least one base station BS. Such a base station BS is a radio station that, via a radio interface, can set up connections to further radio stations such as, for example, radio stations MS or to other mobile and stationary terminal devices. Each base station forms at least one radio cell C. Given a sectorization or given hierarchic cell structures, a plurality of radio cells C are also supplied per base station BS. The functionality of this structure is used by the radio communication system of the invention; however, it can also be transferred to other radio communication systems such as, for example, subscriber access networks with wireless subscriber lines, wherein the invention can be used.

Figure 2:
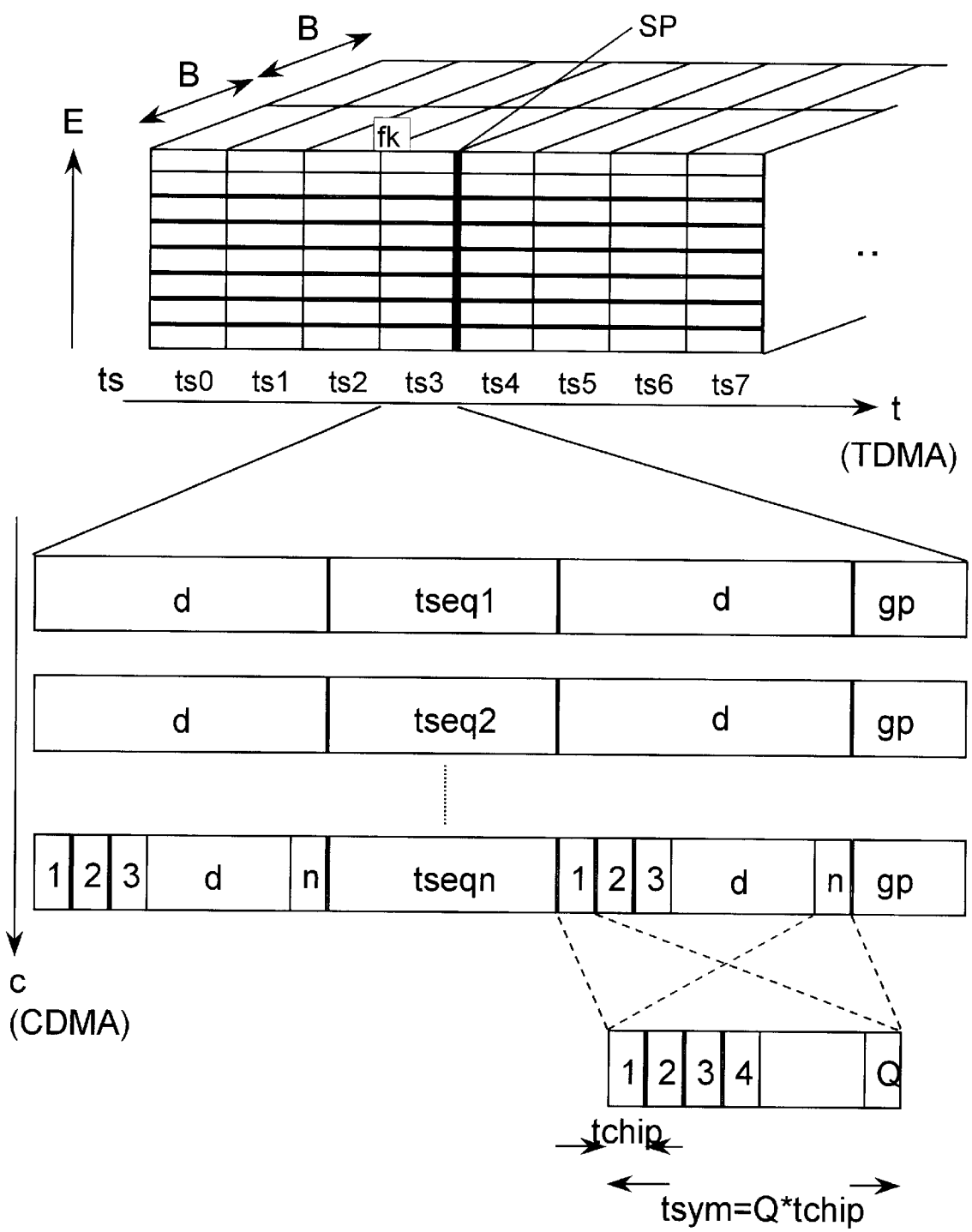
FIG. 2 is a schematic illustration of the frame structure of the radio interface and of the structure of a radio block.

The frame structure of the radio interface can be seen from FIG. 2. According to a TDMA component, a division of a broadband frequency range, for example the bandwidth B=1.2 MHz, is provided into a plurality of time slots ts, for example 8 time slots ts0 through ts7. Each time slot ts within the frequency band B forms a frequency channel fk. The successive time slots ts are ordered according to a frame structure within a broadband frequency range B. Eight time slots ts0 through ts7 are thus combined into one frame.

Given a utilization of a TDD transmission method, one part of the time slots ts1 through ts7 is employed in upstream direction and one part of the time slots ts0 through ts7 is employed in downstream direction, whereby the transmission in upstream direction occurs, for example, before the transmission in downstream direction. A switching time SP lies therebetween. A frequency channel fk for the upstream direction corresponds, in this case, to the frequency channel fk for the downstream direction. The other frequency channel fk are structured in the same way.

Information of a plurality of connections are transmitted in radial blocks within the frequency channels fk that are provided for the payload data transmission. These radial blocks for payload data transmission are composed of sections having data d wherein sections having training sequences tseq1 through tseqn known at the reception side are respectively embedded. The data d are spread in call-associated fashion with a fine structure, a spread code c (CDMA code), so that, for example, n connections can be separated by these CDMA components at the reception side.

The spread of individual symbols of the data d with Q chips causes the sub-sections having the duration tchip to be transmitted within the symbol duration tsym Q. The Q chips thereby form the individual CDMA code c. Further, a guard time gp for the compensation of different signal running times of the connections of successive time slots ts is provided within the time slot ts.

Figure 3:
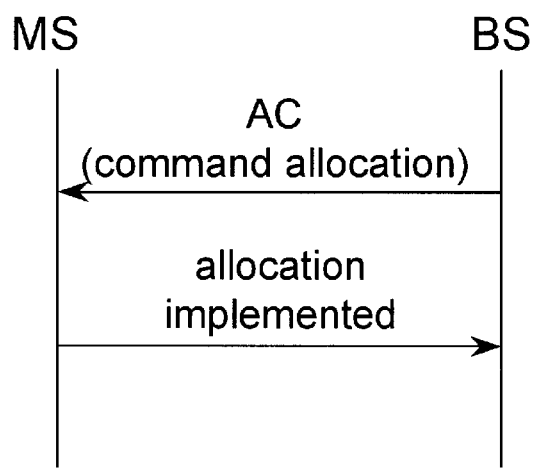
FIG. 3 is a signaling sequence of the allocation of channels to a radio station.

FIG. 3 shows a signaling sequence for a successful allocation of channels to a radio station MS that is located in the area of the radio-oriented coverage by a base station BS. Only the expansions compared to the known algorithm from the GSM mobile radio telephone system are thereby shown.

The implementation of the allocation of channels to the radio station MS occurs based on the GSM mobile radio telephone system in such a way that the base station BS transmits the signaling message AC (access command) to the radio station MS, the latter being requested therein to employ the specific channels for the payload information. The radio station MS acknowledges the successful implementation of the allocation with the signaling message (allocation implemented).

FIG. 4 shows the structure of the signaling message AC in the form of a table. In addition to further information elements not recited in the table, the signaling message AC is composed of information elements like the UCD (uplink channel descriptor) and the DCD (downlink channel descriptor). These information elements are mandatory and, due to this fact, are identified with an m in the right-hand column of the table. Optionally, further information elements such as, for example, additional UCD (additional uplink channel descriptor) and additional DCD (additional downlink channel descriptor) or channel mode can be added to these information elements UCD and DCD. These optional information elements are identified with a "o" in the right-hand column, whereby the identifier "*" states that these information elements can also be repeatedly represented in the signaling message AC. For example, the signaling message AC for each frequency channel fk that is to be additionally allocated to the radio station MS is expanded by a corresponding, additional information element additional UCD or additional DCD.

The information element UCD indicates which channels in a specified frequency channel fk are to be employed in the upstream direction. When the radio station MS is to employ a plurality of frequency channels fk in the upstream direction, then the signaling message respectively contains an additional information element additional UCD for each further, specified frequency channel fk. The procedure for the allocation of channels for the downstream direction by the information element DCD and additional DCD is analogous thereto, whereby the respective plurality of frequency channels fk in the upstream and downstream direction can be different.

In order to specify the employed channels in a TD/CDMA radio communication system, whereby the possibility of channel pooling and of an asymmetrical plurality of channels for the upstream and downstream direction should be established, it is required that the information elements UCD or, respectively, DCD contained in the signaling message AC be correspondingly designed. In order, for example, to specify a channel for the upstream direction, the following information are required:

frequency channel or frequency skip sequence, time slot or time slot skip sequence, CDMA code or, respectively, code skip sequence, midamble code, and carrier service (modulation type and interleaving type).

Further, the fact can be advantageously utilized for the design of the structure of the signaling message AC that, given an allocation of a plurality of channels in the upstream and/or in the downstream direction, these channels are usually contained in a shared time slot ts of a frequency channel fk in order to be able to implement the signal processing in the reception unit of the radio station MS with less calculating expense and to likewise have to activate the reception as well as the transmission unit only for the duration of a time slot ts. Only when one time slot ts is inadequate, are channels in a plurality of time slots ts allocated; these, however, advantageously lie in one frequency channel fk.

At the point in time of the reception of the signaling message AC and as a result of preceding signaling information, the radio station MS has knowledge regarding which, frequency channels or frequency skip sequences, time slots or, respectively, time slot skip sequences, CDMA code family and, potentially, which CDMA code skip sequence, and midamble codes in the upstream direction can be employed in the radio cell in which it resides at the moment. Based on these parameters, a channel is defined in the upstream direction by four particulars and a channel in the direction is defined by three particulars—the midamble code is known a'priori in downstream direction.

According to a specification known from the GSM mobile radio telephone system, an information element can, for example, be composed of three fields, a type field T, a length field L and a value field W. The type field T is employed when the information element is optional or conditional. It serves the purpose of naming the information element and is not required given mandatory information elements, since these can already be identified as a result of their position in the signaling message AC. The length field L is required when the length 1 of the sub-information elements in the value field W is not known a'priori. The length field, for example, is eight bits long and has the plurality of octets that comprise the value field W as content.

The information elements DCD or, respectively, UCD shown by way of example in FIGS. 5 and 6 respectively have the format T-L-W that corresponds to the three aforementioned field types. The information elements DCD or UCD can be utilized in the indicated form as mandatory information elements and, in the identical form, can be utilized as additional DCD and additional UCD as optional information elements in a signaling message AD. When the information element DCD or, respectively, UCD is to be employed as a mandatory information element, then the format can be reduced to the form L-W by omitting the type field T. The value field W is respectively composed of a plurality of sub-information elements. The lengths of the respective fields or sub-information elements in the respective information element DCD or, respectively, UCD are indicated in bits in the right-hand column of the table.

FIG. 5 illustrates the structure of the information element DCD or additional DCD in the form of a table by way of example. The information element DCD or, respectively, additional DCD is employed in order to select a sub-set from the sum of possible channels for the downstream direction from the base station BS to the radio station MS for a selectable frequency channel fk. It is assumed for this selection that the radio station MS knows the frequency channels fk or frequency skip sequences employed in the radio cell in which it resides at the moment, whereby, for example, a maximum of $2^7=128$ frequency channels fk or frequency skip sequences are employed;

a maximum of $2^5=32$ time slots ts or time slot skip sequences are, for example, employed in the radio cell that are already known to the radio station MS; and the radio station MS knows the midamble basic code.

The type field T is indicated in the first line of the information element DCD; the length field L is indicated in the second line; and the sub-information elements of the value field W are indicated in the further lines. The length is indicated in bits for the respective field or sub-information element in the right-hand column of the table. The designation of a sub-information element with an "*" means that this sub-information element can occur repeatedly.

The frequency channel selection sub-information element Nr__fk that selects one of the possible 128 frequency channels fk is entered with a length of 7 bits in the first line of the value field W. All further, following sub-information elements of the value field W respectively refer to this selected frequency channel fk. The sum time slots sub-information element Nr__ts in the second line of the value field W indicates the number of time slots ts or time slot skip sequences into which the previously specified frequency channels fk is sub-divided. The length of the sum time slots sub-information element Nr__ts of 5 bits allows the maximum plurality of $2^5=32$ time slots ts to be documented.

The time slot selection sub-information element ts-flags is indicated in the third line of the value field W. A mark (flag) is allocated to each existing time slot ts, this being set when the respectively time slot ts is selected. The length of the time slot selection sub-information element ts-flags in bits thus corresponds to the plurality of time slots ts and is therefore taken from the sum time slot sub-information element Nr__ts. The overall number of marks set by the time slot selection sub-information element ts-flags is referred to in the rest of the specification as the variable Nr__tsges.

The sum code sub-information element Nr__c in the fourth line of the value field W indicates how many CDMA codes c or disjunctive CDMA code skip sequences exist within a time slot ts. The length of the Nr__c of 5 bits makes it possible to document a maximum plurality of $2^5=32$ CDMA codes c.

The value field W is terminated by one or more code selection sub-information elements c-flags. These code selection sub-information elements c-flags contain exactly one mark for each CDMA code c defined within a time slot ts, which can be set in order to select a code c. The length of the code selection sub-information element c-flags in bits corresponds to the plurality of CDMA codes c per time slots ts that is known from the Nr__c. The code selection sub-information elements c-flags respectively exists for each selected time slot ts. For this reason, the total number of bits for the code selection sub-information element c-flags corresponds to the plurality Nrc multiplied by the total number Nr__tsges of selected time slots ts.

In the specification of a channel in the downstream direction, contrasting with the specification of a channel in upstream direction, the specification of a midamble can be foregone, since the base station BS employs the same midambles for all channels in the downstream direction.

FIG. 6 shows the structure of the information element UCD or additional UCD. The information element UCD is employed in order to select a sub-set of the sum of channels for the upstream direction from the radio station MS to the base station BS for a selectable frequency channel sk. It is assumed for this selection that the radio station MS knows the frequency channel fk or frequency skip sequences employed in the radio cell in which it resides at the moment, whereby a maximum of $2^7=128$ frequency channels fk or frequency skip sequences are employed;

a maximum of $2^5=32$ time slots ts or time slot skip sequences that are already known to the radio station MS are employed in the radio cell;

the radio station MS knows the midamble base code; and the radio station MS knows how the maximum of $2^5=32$ midamble codes are determined from the midamble base code.

The information element UCD is constructed identical to the information element DCD, whereby the value field W is additionally expanded by a sum midamble sub-information element Nr__m and a midamble selection sub-information element m-flags. The sum midamble sub-information element Nr__m indicates the plurality of midamble codes m. Analogous to the channel selection sub-information element c-flags, a midamble selection sub-information element m-flags is provided for each selected time slots ts, it following therefrom that the information element UCD Nr__tsges contains sub-information elements of the m-flags type.

Given employment of respectively only one carrier service in a time slot, the use of a single midamble m is possible for the respective time slots ts, as a result whereof the signaling expense is advantageously reduced. For a selection of a respective midamble m for each channel in a time slot ts, for example given a utilization of a plurality of carrier services within a time slot ts, the information element UCD can be expanded by additional midamble selection sub-information elements m-flags that, in addition to the selected time slot ts, respectively additionally refer to a CDMA code c selected therein.

Given employment of the invention in a TDD system, wherein information are transmitted in downstream and upstream direction in the same frequency channel fk, as shown in FIG. 2, the selection of a frequency channel fk can occur in common for the downstream and upstream direction with, for example a further information element in the signaling message, whereby the following selection of the time slots ts and CDMA codes s can be centrally dependent on this selection.

By way of example, FIG. 7 shows the sequence of a channel allocation from the downstream or upstream direction with the individual sub-information elements in a table. The designations of the respective sub-information elements are recited in the first, left-hand column of the table. The second column contains the lengths of the respective sub-information element in bits. Exemplary values for bit sequences are entered in the third column, these being employed for the selection or the marking of the time slots ts0 through ts7 and of the CDMA codes c0 through c7. The right-hand column contains comments for a better understanding of the table.

The plurality of time slots ts for a previously selected frequency channel fk is defined in the first line of the table by the sum time slots sub-information element Nr_ts. The binary value of the illustrated bit sequence yields a plurality dk of eight time slots ts0 through ts7 per frequency channel fk. The time slots ts0 and ts3 are marked and selected in the correspondingly listed time slots ts0 through ts 7 in the second line by the bit sequence of time slot selection sub-information element ts-flags indicated by way of example, whereby a marking respectively occurs with a binary 1.

The plurality of employable CDMA codes c in the time slots ts is defined in the third line of the table of FIG. 7 by the sum code sub-information element Nr_c. The bit sequence indicated by way of example yields a plurality of 8 CDMA codes c0 through c7 per time slots ts. In the following lines 4 and 5, the CDMA channels c0 and c1 in the time slot ts0 or, respectively, the CDMA channels c4 and c5 in the time slots ts3 are now selected by the corresponding bit sequences for the time slots ts0 and ts3 selected in the selected line. The marking of a CDMA code thereby again occurs with a binary 1. The selected CDMA codes are arbitrarily selected in terms of number and position—an exemplary marking of 3 CDMA codes in the time slot ts0 and of only one CDMA code in the time slot ts3 are likewise conceivable. The invention thereby allows a very flexible selection of the desired parameters.

The definition of the plurality of time slots ts per frequency channel fk as well as of the plurality of CDMA codes c per time slot ts by the sum time slot Nr_ts and the sum code sub-information element Nr_c is obsolete in a general and non-variable embodiment of the radio interface of the radio communication system, as a result whereof the signaling expense is advantageously reduced further.

The information elements DCD or UCD in table form shown in FIGS. 8 and 9 corresponds to the information elements DCD or UCD of FIGS. 5 and 6, whereby the hierarchic sequence of the sub-information elements has been modified. Following a selection of a frequency channel fk by the frequency channel selection sub-information element Nr_fk, a selection of CDMA codes c occurs in the information elements DCD or UCD of FIGS. 8 and 9 with the code selection sub-information element c-flags. This sub-information element c-flags, in contrast to FIGS. 5 and 6, only appears once, the reason for this being the central selection of the CDMA code c. Subsequently, one or more time slots ts are allocated to the selected CDMA codes c by the time slot selection sub-information element ts-flags. This selection reduces the plurality of sub-information elements in the respective information elements DCD or UCD; however, it must be assured that the selected CDMA codes c are available in the respectively selected time slots ts.

FIG. 10 represents a channel allocation by an information element DCD or UCD, whereby the allocation occurs according to the sequence described in the explanation of FIGS. 8 and 9. After the selection of a frequency channel fk by a frequency channel selection sub-information element Nr_k (not shown), a definition of the plurality of CDMA codes c per time slot ts occurs in the first line of the table. The bit sequence indicated by way of example yields a plurality of 8 CDMA codes c0 through c7 per time slot ts. In the second line of the table, the CDMA codes c0 and c1 are selected by the code selection sub-information element c-flags, whereby the selection occurs by a marking with a binary 1.

For these selected CDMA codes c0 and c1, the time slots ts0 and ts3 are subsequently selected in the fourth line of the table by the sum time slot sub-information element Nr_ts in the third line after the definition of the plurality of time slots ts per frequency channel fk. This selection of the time slots ts0 and ts3 again occurs by a marking with binary ones in the bit sequence indicated by way of example. As a result of the channel allocation in FIG. 10, the CDMA codes c0 and c1 in the time slots ts0 and ts3 have been allocated to a radio station MS, whereby it is of no consequence in this example whether the channel allocation ensues for the upstream or downstream direction.

Although various minor changes and modifications might be proposed by those skilled in the art, it will be understood that our wish is to include within the claims of the patent warranted hereon all such changes and modifications as reasonably come within our contribution to the art.

We claim:

1. A method for channel allocation in a radio communication system that uses a TD/CDMA subscriber separation method, comprising the steps of:

signaling an allocation of at least one channel from a sum of available channels to a radio station by an information element in a signalling message;

selecting at least one time slot from a fixed sum of time slots by a time slot selection sub-information element in the information element; and subsequently selecting at least one CDMA code from a fixed sum of CDMA codes for each selected time slot by a code selection sub-information element in the information element, whereby a number of code selection sub-information elements for the selection of the CDMA codes corresponds to the number of selected time slots.

2. The method according to claim 1 wherein a frequency channel for upstream or downstream is additionally selected from a sum of frequency channels by a frequency channel selection sub-information element in the information element, whereby the selection of the time slots is referred to the selected frequency channel.

3. The method according to claim 2 wherein the allocation of additional channels in at least one further frequency channel is signaled to the radio station with an additional information element in the signalling message for each additional frequency channel, a structure of the additional information element corresponding to that of the information element.

4. The method according to claim 1 wherein the sum of the time slots is indicated by a sum time slot sub-information element in the information element or the sum of the CDMA codes for a time slot is indicated by a sum code sub-information element in the information element.

5. The method according to claim 1 wherein
a sum of a midamble for an upstream direction is indicated with a sum midamble sub-information element in the information element; and
a midamble from the sum of midambles is subsequently respectively selected for each selected time slot with a midamble selection sub-information element.

6. The method according to claim 1 wherein the radio station determines a number of channels to be allocated from a length of the information element.

7. The method according to claim 6 wherein the radio station is informed of the length of the information element by a length field in the information element.

8. The method according to claim 1 wherein the allocation of the channels for an upstream direction and for the downstream direction are signaled to the radio station independently of one another in a signalling message.

9. The method according to claim 1 wherein a channel is defined as a combination of a frequency channel or a frequency skip sequence, of a time slot or a time slot skip sequence, and of a CDMA code or a CDMA code sequence or hybrids.

10. The method according to claim 1 wherein a specification of properties of the channels is additionally signaled to the radio station with an additional information element in the signalling message.

11. A method for channel allocation in a radio communication system that uses a TD/CDMA subscriber separation method, comprising the steps of:

signalling an allocation of at least one channel from a sum of available channels to a radio station by an information element in a signalling message;

selecting at least one CDMA code from a fixed sum of CDMA codes for each selected time slot by a code selection sub-information element in the information element; and subsequently selecting at least one time slot from a fixed sum of time slots by a time slot selection sub-information element in the information element, whereby the selected CDMA codes being used in each selected time slot.

12. The method according to claim 11 wherein a frequency channel for upstream or downstream is additionally selected from a sum of frequency channels by a frequency channel selection sub-information element in the information element, whereby the selection of the time slots is referred to the selected frequency channel.

13. The method according to claim 12 wherein the allocation of additional channels in at least one further frequency channel is signaled to the radio station with an additional information element in the signalling message for each additional frequency channel, a structure of the additional information element corresponding to that of the information element.

14. The method according to claim 11 wherein the sum of the time slots is indicated by a sum time slot sub-information element in the information element or the sum of the CDMA codes for a time slot is indicated by a sum code sub-information element in the information element.

15. The method according to claim 11 wherein a sum of midambles for an upstream direction is indicated with a sum midamble sub-information element in the information element; and a midamble from the sum of midambles is subsequently respectively selected for each selected time slot with a midamble selection sub-information element.

16. The method according to claim 11 wherein the radio station determines a number of channels to be allocated from a length of the information element.

17. The method according to claim 16 wherein the radio station is informed of the length of the information element by a length field in the information element.

18. The method according to claim 11 wherein the allocation of the channels for an upstream direction and for the downstream direction are signaled to the radio station independently of one another in a signalling message.

19. The method according to claim 11 wherein a channel is defined as a combination of a frequency channel or a frequency skip sequence, of a time slot or a time slot skip sequence, and of a CDMA code or a CDMA code sequence or hybrids.

20. The method according to claim 11 wherein a specification of properties of the channels is additionally signaled to the radio station with an additional information element in the signaling message.

21. A system for channel allocation in a radio communication system that uses a TD/CDMA subscriber separation method, comprising:

a base station which signals an allocation of at least one channel from a sum of available channels to a radio station by an information element in a signaling message, at least one time slot from a fixed sum of time slots being selected by a time slot selection sub-information element in the information element, and wherein at least one CDMA code from a fixed sum of CDMA codes is selected for each selected time slot by a code selection time sub-information element in the information element, a number of code selection sub-information elements for the selection of the CDMA codes corresponding to the number of selected time slots.

* * * * *